United States Patent [19]

Chea, Jr.

[11] Patent Number: 4,602,130

[45] Date of Patent: Jul. 22, 1986

[54] DUAL VOLTAGE SOURCE FEED CIRCUIT CONFIGURATION FOR A TELEPHONE LINE CIRCUIT

[75] Inventor: Ramon C. W. Chea, Jr., Monroe, Conn.

[73] Assignee: ITT Corporation, New York, N.Y.

[21] Appl. No.: 660,585

[22] Filed: Oct. 15, 1984

[51] Int. Cl.[4] .......................................... H04M 19/00
[52] U.S. Cl. .................. 179/18 FA; 179/77
[58] Field of Search .......... 179/18 FA, 16 AA, 16 F, 179/70, 77, 99 LC

[56] References Cited

U.S. PATENT DOCUMENTS

| | | | |
|---|---|---|---|
| 4,267,408 | 5/1981 | Schoofs | 179/77 |
| 4,306,122 | 12/1981 | Nijman et al. | 179/170 NC |
| 4,315,106 | 2/1982 | Chea, Jr. | 179/16 F |
| 4,410,766 | 10/1983 | Beirne | 179/16 F |
| 4,431,869 | 2/1984 | Sweet | 179/77 |
| 4,465,967 | 8/1984 | Tokunaga et al. | 323/285 |
| 4,499,532 | 2/1985 | Hudson et al. | 363/21 |
| 4,511,763 | 4/1985 | Skidanenko et al. | 179/16 AA |
| 4,514,595 | 4/1985 | Rosenbaum et al. | 179/16 F |

Primary Examiner—Gene Z. Rubinson
Assistant Examiner—R. Vaas
Attorney, Agent, or Firm—Peter C. Van Der Sluys; Robert A. Hays

[57] ABSTRACT

A dual voltage source feed circuit arrangement for a two-wire telephone line circuit includes an auxiliary voltage source placed across the two-wire line and switchably controlled to connect the voltage source across the line to thereby supply an additional current to the line which current provides a optimum value of talk current to the line.

14 Claims, 3 Drawing Figures

DUAL VOLTAGE SOURCE FEED CIRCUIT CONFIGURATION FOR A TELEPHONE LINE CIRCUIT

BACKGROUND OF THE INVENTION

The present invention generally relates to telephone line circuits and, in particular, relates to a feed circuit for such a telephone line circuit employing a floating voltage supply together with the standard central office voltage supply.

Modern telecommunications systems employ digital techniques to implement communications between various subscribers. These systems have become extremely sophisticated and enable the transmission of voice and data in a rapid and reliable manner. An example of a typical system is the ITT 1240 Digital Exchange. This system has been widely publicized and has many innovative features which are the subject matter of many patents. A major consideration in the design of such switching systems resides in the implementation of the line circuit.

In a telephone system the line circuit is responsible for a substantial portion of the cost of the system as each subscriber to the system is associated with a separate line circuit. Hence, workers in the field have been cognizant of such problems and have attempted to simplify the line circuit while making the same more efficient. Thus, the literature is replete with various structures which are dedicated to reducing power dissipation and component count in a line circuit.

See for example, U.S. Pat. No. 4,387,273 entitled SUBSCRIBER LINE INTERFACE CIRCUIT WITH IMPEDANCE SYNTHESIZER issued June 7, 1983 to R. C. W. Chea, Jr. and assigned to International Telephone and Telegraph Corporation, the assignee hereof. See also, U.S. Pat. No. 4,315,106 entitled "APPARATUS FOR REGULATING CURRENT SUPPLIED TO A TELEPHONE LINE SIGNAL OF THE TYPE EMPLOYED IN DIGITAL TELEPHONE SYSTEMS issued on Feb. 9, 1982 to R. C. W. Chea, Jr. and assigned to the assignee hereof.

These patents are but a few of the many patents which relate to line circuits. Essentially, based on the technical strides made in the field of integrated circuit technology, it has been an object of the prior art to provide as many integrated components as possible in order to implement a line circuit structure. It is also known that various functions associated with the line circuit cannot easily be accommodated by the use of integrated circuits. That is, for example, basic line driving functions include the application of a DC voltage to the subscriber line, the accommodation of the high voltage ringing signal, the transmission and reception of voice as well as remote metering signals.

The prior art attempted to implement these functions by the use of various devices, many of which were not capable of being integrated. Recently, there has been a series of developments which enable one to accommodate such functions by the use of wideband amplifier structures. For example, reference is made to a co-pending application entitled A WIDEBAND HIGH VOLTAGE AMPLIFIER FOR TELEPHONE EXCHANGE SUBSCRIBER LINE INTERFACE UTILIZING LOW VOLTAGE CONTROL CIRCUITRY filed on Apr. 10, 1984 as Ser. No. 598,650 for R. C. W. Chea, Jr. and assigned to the assignee hereof. Therein, a wideband high voltage and high power amplifier that employs a switching converter with the capacitor storage element coupled across a subscriber line is described. The subscriber line is characterized as having a definite load impedance that is mainly resistive and appears in parallel with the storage capacitor of the switching converter. By using the switching converter in such an environment, an extremely efficient, relatively inexpensive, reliable line circuit capable of handling high voltage ringing signals and other signals is achieved.

Another important consideration in the design of a line circuit, since the number of subscribers in a typical telephone system is quite large, i.e., 10,000 or more is the problem of power dissipation. Consequently, even a small savings in power on a per line basis translates into a substantial savings in power from a system viewpoint.

SUMMARY OF THE INVENTION

Accordingly, one object of the present invention is to provide line feed circuit configuration that may be employed in a line circuit to substantially reduce power dissipation and to improve operation.

This object is accomplished, at least in part, by a line circuit including a selectively operated voltage source coupled across the line and operative to supply an auxiliary operating current thereto.

Other objects and advantages will become apparent to those skilled in the art from the following detailed description read in conjunction with the appended claims and the drawings attached hereto.

DETAILED DESCRIPTION OF THE INVENTION

Figure 1:
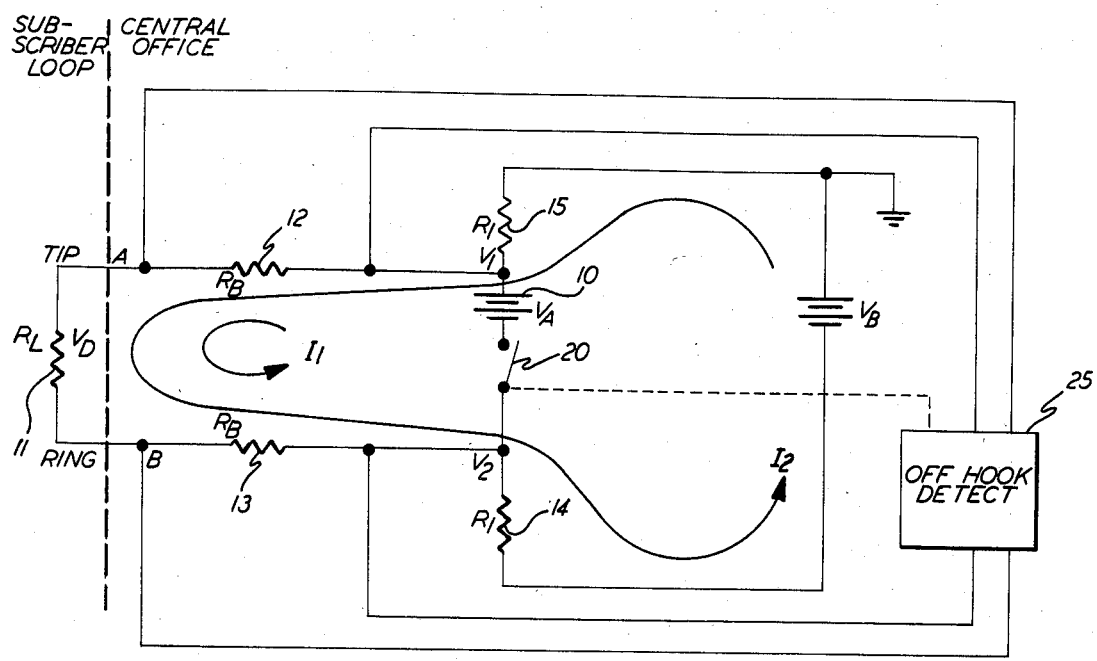
FIG. 1 is a schematic diagram depicting a dual feed arrangement for a line embodying the principles of the present invention.

Referring to FIG. 1, there is shown a schematic diagram of a line circuit utilizing a floating DC source 10 also designated as $V_A$ Essentially, the resistor 11 constitutes the line impedance and is conventionally designated as $R_L$. The line impedance of a subscriber line, in the off hook condition, is a function of the length of a subscriber line, and the typical impedance of such lines may vary between a very low value to over 200 ohms or more.

As seen from FIG. 1, the floating DC source 10 is coupled to the line terminals A and B via equal resistors 12 and 13 designated as $R_B$. The terminals A and B, on the respective sides of a subscriber line, are also referred to as the ring, or R, side and the tip, or T, side of the line. The central office battery, conventionally supplied by the switching system, is designated as $V_B$ and often varies between 48 to 60 volts depending on the particular telephone exchange. The central office battery is supplied to the line circuit terminals via the feed resistors 14 and 15.

These resistors are selected to be much greater in magnitude than resistors, 12 and 13. In regard to the circuit of FIG. 1, the office battery $V_B$ is the regular central office battery and the floating DC source 10, for example, is a switching DC/DC converter that can be employed for line supervision and line feed respectively.

Such converters have been utilized in line circuits in the past. For example, see the above referenced U.S. Pat. No. 4,315,106 wherein FIG. 5 thereof depicts a DC/DC coverter in conjunction with a line circuit.

In any event, as will be explained, in the on hook state, the converter 10 is turned off and the off hook supervision is performed solely by the central office battery $V_B$. The turning off of the floating voltage supply $V_A$ is accomplished by means of the switch 20 effectively in series with the $V_A$ supply as shown in FIG. 1.

This technique results in eliminating the over head power dissipation and high frequency noise which is associated with a switching converter in the idle state. After the off hook condition is detected, the switching converter 10 is turned on to then provide the proper line feed current. Based on the circuit shown in FIG. 1, it will be understood that the voltage source $V_A$ can be structured to be an amplifier having a bandwidth and power capability enabling it to handle DC, ringing, voice and remote metering signals having a frequency of, for example, between 12 to 16 KHz. In this manner the amplifier is a single device capable of handling all of the basic driving functions of the line circuit.

As will be further explained, the amplifier can have the basic structure of a switching type converter.

With reference to FIG. 1, when the switch 20 is open, and the line is idle, e.g. on hook, which in turn infers that $R_L$ is infinitely large, then the voltages at the junctions between resistors, 12 and 15, and resistors, 13 and 14, denoted as $V_1$ and $V_2$ respectively, are as follows:

$$V_1 = 0$$

$$V_2 = V_B$$

When the switch 20 is closed the voltages, $V_1$ and $V_2$, can be shown to be as follows:

$$V_1 = -\tfrac{1}{2}(V_B - V_A)$$

$$V_2 = -\tfrac{1}{2}(V_B + V_A)$$

The preceding two equations are valid for either when line is on hook (idle, $R_L = 10$ Kohm to infinity) or off hook ($R_L$ equal to finite value).

As can be further ascertained from FIG. 1, when switch 20 is closed, current can flow due to the floating source 10.

When switch 20 is open, as for example in the on hook state, the central office battery performs the off hook supervision. The resistors, 12 and 13, are selected to be in the range of 25 to 200 ohms, while the resistors $R_1$ are in the range of 5,000 to 50,000 ohms. As indicated, in the on hook state the voltage source 10 is turned off by the equivalent of opening up switch 20. In one actual implementation, the voltage source 10 is a DC/DC converter or amplifier. Thus, the central office battery $V_B$ is used mainly to detect the off hook condition. The floating supply 10 is turned on in the off hook state to provide talk current to the loop.

As seen in FIG. 1, an off hook detector 25 senses the loop current ($I_2$) due to the subscriber line going off hook and upon detection of this condition operates switch 20 to place the voltage source 10 ($V_A$) in circuit and cause an additional loop current ($I_1$) to flow. The additional loop current supplies the necessary talk current to the line. This turn-on operation, in a system environment, can be executed by the software of such a system. As will be described in conjunction with FIG. 3, the off hook detector 25 is a conventional circuit configuration and senses the current flow in the two-wire line due to the subscriber going off hook and furnished by the central office battery $V_B$.

Based on this arrangement, there is very low power consumption in both the on hook and the off hook conditions.

Figure 2:
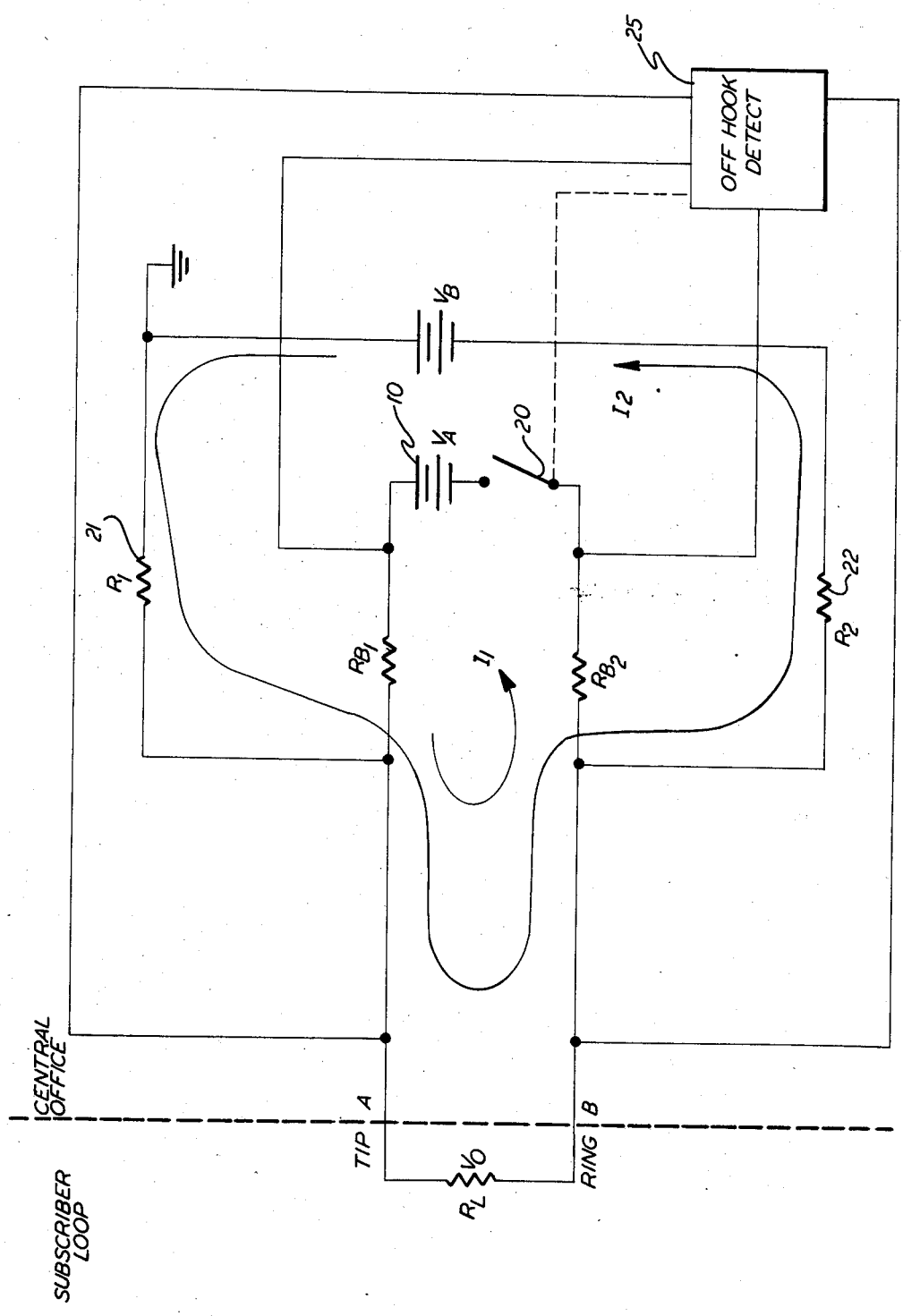
FIG. 2 is a schematic of an alternate embodiment.

Referring to FIG. 2, there is shown a similar circuit as FIG. 1 wherein the central office battery is connected to the line terminals A and B, or the tip and ring terminals, via resistors $R_1$ and $R_2$ designated as 21 and 22, respectively. These resistors are auxiliary feed resistors for the central office battery. If one compares the circuit of FIG. 1 with the circuit of FIG. 2, one can see that the floating source 10 is under the control of switch 20 with the major difference between the circuits residing in the portion of the central office battery $V_B$.

Figure 3:
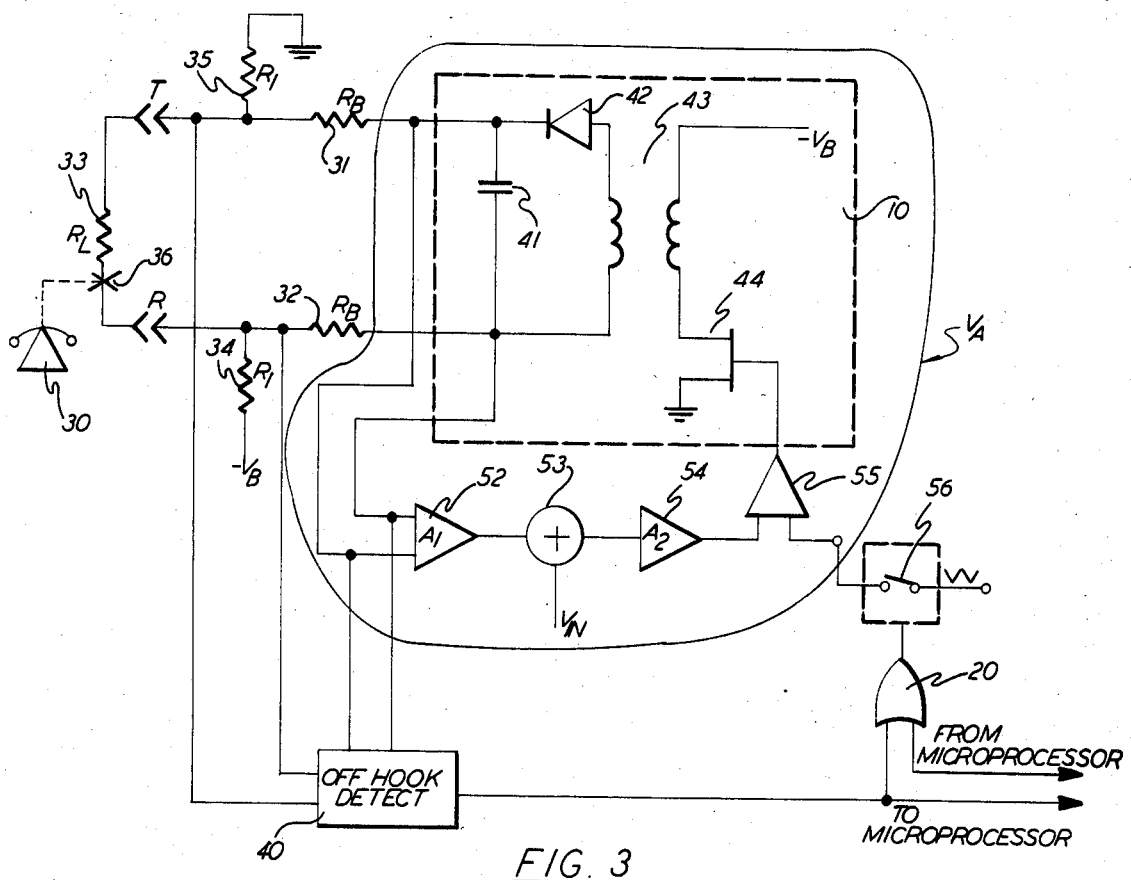
FIG. 3 is a detailed circuit schematic of a dual feed arrangement for a line circuit according to the principles of the present invention.

Referring to FIG. 3, there is shown the dual feed arrangement according to this invention whereby the auxiliary voltage source includes a switching converter amplifier configuration. Such amplifier configurations have been extensively described in the above noted co-pending application. A WIDEBAND HIGH VOLTAGE AMPLIFIER FOR TELEPHONE EXCHANGE SUBSCRIBER LINE INTERFACE UTILIZING LOW VOLTAGE CIRCUITRY filed Apr. 10, 1984 as Ser. No. 598,650 by R. C. W. Chea, Jr. and assigned to the assignee hereof.

In any event, as one can ascertain from FIG. 3, the subscriber line which is normally associated with a subscriber subset 30 is coupled to the tip (T) and ring (R) lines by means of the feed resistors 31 and 32 designated as $R_B$. The subscriber line constitutes a two-wire line of a length depending upon the distance of the line from the central office and is manifested in having a definite impedance 33 which is mainly a resistive component and designated as $R_L$.

As seen from FIG. 3, the central office battery $V_B$ is coupled to the line by means of resistors, 34 and 35, designated as $R_1$ which resistors are much greater in magnitude than resistors 31 and 32. In a typical example resistors, 34 and 35, would be about 20,000 ohms, while resistors 31 and 32 would be about 100 ohms. The subscriber subset 30, data terminal or other device is normally associated with a hook switch (HS) 36.

Hence, when a subscriber picks up the handset by answering ringing or initiating a service request, an off-hook condition exists where the hook switch closes. In this manner, the central office battery $V_B$ supplies a loop current through the subscriber line and through the closed hook switch. The loop current is detected by the line circuit in the typical fashion by means of an off hook detector 40 (25 of FIGS. 1 and 2).

Essentially, the off hook detector is operative to detect a current flow in the subscriber line which is indicative of the closing of the hook switch 36.

For an example of suitable circuitry, reference is made to U.S. Pat. No. 4,254,305 entitled CURRENT LIMITED SUBSCRIBER LINE FEED CIRCUIT issued on Mar. 3, 1981 to R. Treiber and assigned to the assignee hereof.

As will be explained, when the subscriber goes off hook, the initial loop current is supplied by the central office battery $V_B$. As soon as off hook is detected, the auxiliary voltage $V_A$ is impressed upon the line to provide talk current to the loop and to provide the other features as the ringing, voltage and so on to the loop. In this manner the subscriber line is efficiently operated.

Accordingly, during the on hook state, there is no current flowing in the subscriber loop due to the central office battery or due to the auxiliary voltage source $V_A$. The on hook state is the predominate state. As one can ascertain, a subscriber line is mainly on hook during most of the day. Hence, during the on hook state, there is no power dissipated from the office battery or from the auxiliary voltage source. When the subscriber goes off hook, this condition is detected by monitoring the current flow due to the central office battery. When the off hook condition is detected, the auxiliary voltage source is activated and additional current is supplied to the loop to provide an optimum talk current. Hence, the circuit operation, based on the use of the auxiliary voltage source activated only during the off hook condition, results in a lower power dissipation in the off hook condition based on the operation of the amplifier utilizing a switching converter. This aspect of the amplifier has been fully described in the above noted co-pending application which is hereby deemed fully incorporated by reference herein.

Referring back to FIG. 3, reference numeral 10 designates the switching converter portion of the amplifier circuit. The switching converter 10 as included within the dashed lines is a relatively standard component. A capacitor 41 is shunted across the subscriber line and is fed from a diode 42 which is coupled to the secondary of a power transformer 43. The primary of the power transformer 43 has one terminal coupled to the central office battery $V_B$ and another terminal coupled to ground through an FET. An amplifier 52 which is a buffer amplifier has one input terminal coupled to the junction between resistors 31 and 35 and another input terminal coupled to the junction between resistors, 32 and 34. The output of the amplifier 52 is coupled to one input of a summer 53. Another input to the summer is designated as $V_{in}$ and is the input signal terminal for the line circuit. Thus, the signal $V_{in}$ may constitute the ringing signal, the talk signal or a high frequency metering signal. Such signals as applied to line circuits are well known. The output of the summer is coupled to the input of a second amplifier 54 which provides gain and frequency shaping for the switching converter amplifier as necessitated by the line circuit.

The output of amplifier 54 is coupled to one input of a pulse width modulator 55 which has another input coupled to a reference voltage or clock source 56. The pulse width modulator 55 may include a comparator employing, for example, a triangular wave shape reference source. The output of the pulse width modulator 55 is coupled to the gate electrode of the FET 44. As indicated, the FET 44 has its source and drain electrodes coupled in series with the primary winding of the power transformer 43. The secondary winding of the power transformer 43, as indicated, has one terminal coupled to the anode of the diode 42 with the cathode of the diode coupled to the junction between resistor 31 and capacitor 41. The capacitor 41 is shunted across the subscriber line. Essentially, the voltage across the capacitor, i.e., the auxiliary voltage source, is a function of the operation of the pulse width modulator as controlled by the gating of the FET 44.

As indicated above, the entire circuit thus, described is only placed in operation during the off hook condition of the line circuit. Hence, as shown, each of the various modules such as amplifiers 52 and 54, the pulse width modulator 55, the clock source and so on must receive an operating potential. Hence, one way of implementing operation of the amplifier, including the switching converter, is to supply the source voltage for the above components through an additional switching device such as an FET. The gate electrode thereof is coupled to the output of the off hook detector 40. Hence, when the off hook detector 40 detects the off hook state, the FET is turned on to supply bias to the various modules coupled thereto. When the subscriber is on hook, the FET is biased in a high impedance state and the amplifier configuration described does not operate and does not consume power. In this manner, the entire amplifier is completely inactive in the on hook state, and apart from the fact that there is no power dissipation, there is also no high frequency noise generated due to the normal operating conditions of the switching converter. Hence, the amplifier incorporating the switching converter is only active after the off hook condition is detected, and during this time, the auxiliary voltage source generates the voltage $V_A$ to supply the proper line feed current to the line circuit.

The entire amplifier circuit as explained in the co-pending application is operative to handle DC, ringing, voice and remote metering signals.

In FIG. 3, there has been shown one way of assuring amplifier operation only during the off hook condition of the line circuit. There are, of course, many other ways of performing this function by utilizing switching devices in various other locations and by enabling such devices only during detection of the off hook state of the line circuit. The use of the dual voltage source substantially reduces the power dissipation of the line circuit during the off hook state as well as virtually eliminating power dissipation during the on hook state.

It should be obvious to those skilled in the art that many modifications of the above noted techniques may be discerned and all such alternate configurations and modifications are deemed to be included within the scope of the invention.

What is claimed is:

1. In a telephone subscriber line circuit of the type having a two-wire telephone subscriber line emanating from a central office to a subscriber location, said line being supplied with a current from a central office battery, said central office battery being coupled to said line via selected value feed resistors to supply a D.C. current to said line, the combination therewith of an auxiliary voltage source apparatus comprising:

a selectively operated voltage source coupled across said line and operative to supply an auxiliary operating current to said line, said auxiliary voltage source being coupled to said two-wire line via first and second auxiliary feed resistors of a magnitude substantially less than the magnitude of said selected value resistors.

2. The telephone subscriber line combination according to claim 1 further comprising:

switching means coupled to said auxiliary voltage source and operative when closed to cause said auxiliary voltage source to supply said operating current to said line.

3. The telephone subscriber line circuit combination according to claim 2, further comprising off hook detection means coupled to said line circuit and operative to provide a control signal when said line circuit goes off hook and means for applying said control signal to said switching means to cause said switching means to close when said line circuit goes off hook.

4. The telephone subscriber line circuit combination according to claim 2, wherein said switching means is in series with one terminal of said voltage source as coupled to said line.

5. In a telephone subscriber line circuit of the type having a two-wire telephone subscriber line emanating from a central office to a subscriber location, said line supplied with a current from a central office battery, said central office battery being coupled to said line via selected value feed resistors, to supply a D.C. current to said line, the combination therewith of an auxiliary voltage source apparatus for supplying an additional loop current to said telephone line during an off hook condition, comprising:

an actuatable auxiliary voltage source having one terminal coupled to one side of said subscriber line and another terminal coupled to the other side of said line, selectively operated switching means coupled to said voltage source for actuating said voltage source when said subscriber line goes off hook to place said auxiliary voltage in circuit across said two-wire line to thereby supply an additional current to said line in said off hook condition, said selected value feed resistors including a first resistor in series with one of said wires and a second resistor in series with the other one of said wires, with said auxiliary voltage source having one terminal coupled to one of said wires via a third resistor and said another terminal coupled to said other wire through a fourth resistor.

6. The telephone subscriber line circuit according to claim 5, wherein the magnitude of said first and second resistors is much greater than the magnitude of said third and fourth resistors.

7. The telephone subscriber line circuit according to claim 6, wherein said first and second resistors are equal in magnitude and said third and fourth resistors are equal in magnitude but much smaller in magnitude than said first and second resistors.

8. The telephone subscriber line circuit according to claim 5, further comprising off hook detection means coupled to said line circuit and operative to provide a control signal when said line goes off hook.

9. The telephone subscriber line circuit according to claim 8, further comprising means for applying said control signal to said switching means to close said switching means during the presence of said control signal.

10. The telephone subscriber line circuit according to claim 5, wherein said actuatable auxiliary voltage source includes an amplifier circuit having a fly-back converter, with the storage capacitor of said fly-back converter coupled across said line to supply said auxiliary voltage.

11. The telephone subscriber circuit according to claim 5 wherein said switching means is in series with one terminal of said voltage source as coupled to said line.

12. The telephone subscriber line circuit according to claim 5 further comprising means coupled to said auxiliary voltage source for controlling the current supplied to said line circuit.

13. In a telephone subscriber line circuit of the type having a two-wire telephone subscriber line emanating from a central office to a subscriber location, said line supplied with a current from a central office battery, said central office battery being coupled to said line via selected value feed resistors to supply a D.C. current to said line, the combination therewith of an auxiliary voltage source apparatus comprising:

a selectively operated voltage source coupled across said line and operative to supply an auxiliary operating current to said line, said auxiliary voltage source including an amplifier circuit including a fly-back converter coupled across said line to supply said auxiliary voltage.

14. The telephone subscriber line circuit combination according to claim 13, further comprising:

off hook detection means coupled to said amplifier circuit and responsive to said line going off hook to actuate said amplifier during said off hook state.

* * * * *